(12) United States Patent
De Cicco et al.

(10) Patent No.: US 7,916,637 B2
(45) Date of Patent: Mar. 29, 2011

(54) ACTUATOR FOR IMPLEMENTING RATE-BASED PACKET SENDING OVER PACKET SWITCHING NETWORKS

(76) Inventors: Luca De Cicco, Bari (IT); Saverio Mascolo, Irsina (IT)

( * ) Notice: Subject to any disclaimer, the term of this patent is extended or adjusted under 35 U.S.C. 154(b) by 105 days.

(21) Appl. No.: 12/495,824

(22) Filed: Jul. 1, 2009

(65) Prior Publication Data

US 2010/0020691 A1    Jan. 28, 2010

(30) Foreign Application Priority Data

Jul. 9, 2008 (IT) ............................... BA2008A0024

(51) Int. Cl.
*H04J 1/16* (2006.01)
(52) U.S. Cl. ........................................ 370/232; 370/252
(58) Field of Classification Search .................. 370/229, 370/232, 233, 234, 235, 252, 253
See application file for complete search history.

(56) References Cited

U.S. PATENT DOCUMENTS

| | | | | |
|---|---|---|---|---|
| 5,367,523 A | * | 11/1994 | Chang et al. | 370/235 |
| 5,426,640 A | * | 6/1995 | Hluchyj et al. | 370/235 |
| 7,304,951 B2 | * | 12/2007 | Rhee | 370/235 |

* cited by examiner

*Primary Examiner* — Brenda Pham
(74) *Attorney, Agent, or Firm* — Christie, Parker & Hale, LLP (57) ABSTRACT

An actuator is disclosed which is required to implement, without errors, a generic rate-based packet sending algorithm over a packet switching network such as the Internet. Typical applications are audio/video streaming over UDP or TCP, audio/video conference over IP, Voice over IP, real-time data delivery, IP Television, Digital Video Broadcast over IP, client-server or peer-to-peer content distribution, Content Delivery Networks, Hybrid peer-to-peer/CDNs. Rate-based packet sending is of key importance for providing Quality of Service/Experience (QoS/QoE) over the Internet because it provides reduced queuing delays and jitters, and reduced buffer sizes both at application and network layers.

12 Claims, 8 Drawing Sheets

ACTUATOR FOR IMPLEMENTING RATE-BASED PACKET SENDING OVER PACKET SWITCHING NETWORKS

This application is based and claims priority from Italian Patent Application No. BA2008A000024 filed Jul. 9, 2008 in Bari, Italy. This application includes matter protected by copyright.

RELATED APPLICATIONS

This application is related to the WIPO Patent Application WO/2005/022845 "Rate-based congestion control for packet networks" and the US patent application 20070165524 "Rate-based congestion control for packet networks".

BACKGROUND OF THE INVENTION

1. Technical Field

This invention relates generally to efficient rate-based packet sending over packet switching networks. More particularly, the invention relates to a novel method to accurately generate rate-based packet sending at the rate computed by a generic congestion control algorithm. The invention addresses the issues of improving the efficiency in transporting data, audio, video and multimedia content over packet switching networks, such as the Internet, using rate-based congestion control algorithms.

2. Description of the Related Art

Packet switching networks implement a simple store-and-forward service. The most known example of packet switching network is the Internet that is built upon the Internet Protocol (IP).

Up to now, the most part of the Internet traffic is handled by the Transmission Control Protocol (TCP), which implements a congestion control protocol at the transport layer that has been extremely successful to guarantee network stability without admission control. The TCP congestion control implements a window-based protocol that sends a window $\Delta W(t_i)$ of packets every time $t_i$ an acknowledgement (ACK) packet is received. This behaviour originates the bursty nature of the TCP traffic, i.e. the fact that packets are sent in bursts of length $\Delta W(t_i)$. From the point of view of the network, the burstiness of the TCP increases network buffer requirements since queue sizes at least equal to the order of $\Delta W(t_i)$ must be provided for efficient link utilization. Sending a burst of $\Delta W(t_i)$ packets is simple to be implemented, but it is not appropriate both from the point of view of router buffers and from the point of view of users of real-time applications such as audio/video conference or live audio/video broadcast.

To reduce traffic burstiness induced by a window-based congestion control, rate-based congestion algorithms have been proposed as a valid alternative to window-based algorithms for transporting multimedia contents. With rate-based algorithms, packets are sent equally spaced in time, at interval proportional to the inverse of the sending rate.

The first solution proposed in the literature is the Rate Adaptation Protocol. (see R. Rejaie, M. Handley, D. Estrin, "RAP: An End-to-end Rate-based Congestion Control Mechanism for Realtime Streams in the Internet", in Proc of IEEE INFOCOM '99, March 1999). In order to actuate a rate $r_c(t)$, RAP evenly spaces packets at intervals equal to the inter-packet interval (IPI) $t_{ipi}$ computed as $t_{ipi}=p/r_c$, where p is the packet size.

Figure 3:
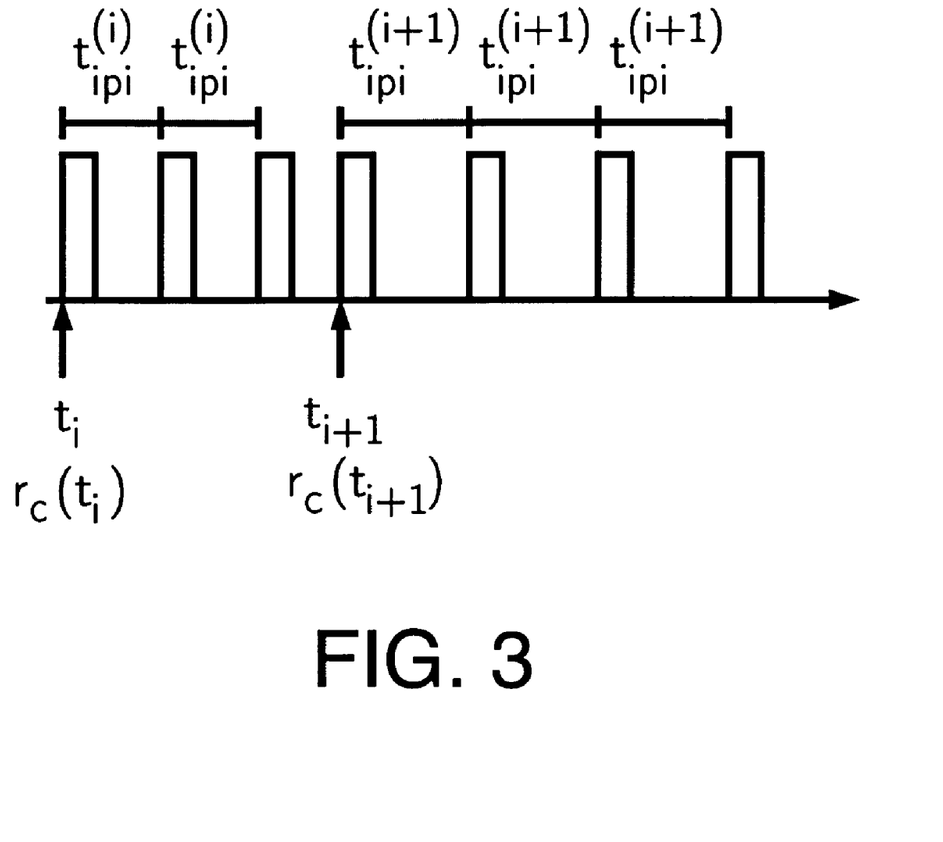
FIG. 3 is a representation of the ideal rate-based sending mechanism.

FIG. 3 shows how packets are sent: each time $t_i$, the controller computes the rate $r_c(t_i)$ and packets are sent equally spaced at intervals $t_{ipi}^{(i)}=p/r_c(t_i)$. When the computed rate changes at time $t_{i+1}$ the inter-packet interval $t_{ipi}^{(i+1)}$ is computed accordingly.

Another rate-based congestion control is disclosed in the US patent appl. Number 20070165524 entitled "Rate based congestion control for packet networks".

At first glance, this simple algorithm seems to be able to provide a sending rate that mitigates the burstiness. However, as it will become more clear shortly, the algorithm neglects the important feature that a general purpose OS cannot guarantee perfect timing in packet sending due to other running processes and timer granularity.

In first instance, the packet send-loop has to schedule a timer whose duration becomes smaller and smaller when the rate increases. However, timer durations are lower bounded by the OS timer granularity $t_g$ that depends on the frequency the CPU scheduler is invoked. By noting that in current Operating Systems typical values for $t_g$ are in the order of 1-10 ms, the maximum achievable rate is given by $r_{max}=p/t_g$, which means that a timer granularity as low as 1 ms and a packet size p=1500B, turns out a maximum rate of 12 Mbps.

In second instance, the sending rate produced by packet gap-based algorithms is not accurate due to the fact that timers are not precise in a general purpose OS. As an example, the popular Symbian operating system, that is one of the leading OS for mobile phones, supports timers whose minimum duration is equal to ⅟64 of second, resulting in an error that can be as high as 15.625 ms.

Let us take a closer look at the way the CPU scheduler assigns processes to the CPU. When a process is running, but the CPU is not assigned to it, the process is said to be in the wait queue. The amount of time a process spends in the wait queue before obtaining again the CPU is defined as waiting time $t_w \geq 0$ and it depends on the CPU load. For this reason, if a process schedules a sleep timer whose nominal duration is t seconds, the process will be actually assigned again to the CPU after $\bar{t}+t_w$ seconds.

Therefore, the actual packet sending rate produced by the packet send loop is affected by the OS load, which acts as a disturbance. In particular, the effective rate is $$\frac{p}{\bar{t}+t_w},$$

which is less than the computed rate $$r_c = \frac{p}{\bar{t}}.$$

Figure 4:
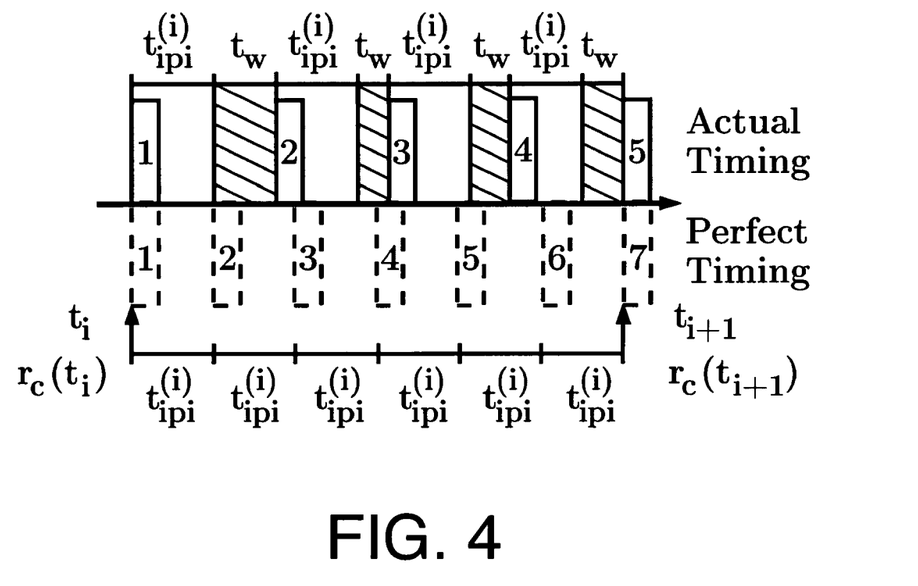
FIG. 4 is a representation of the effect of imprecise timer duration on the rate-based sending mechanism.

FIG. 4 shows perfect timing, i.e. one packet is sent exactly every $t_{ipi}^{(i)}$ (i.e. $t_w$=0), and actual timing, i.e. each packet is sent with a delay $t_w$, which turns out an effective rate $$\frac{p}{t_{ipi}^{(i)}+t_w} < r_c(t_k).$$

In general, the sending rate $r_c(t_i)$ can be computed synchronously, f.i. every round trip time (RTT), or asynchronously every time a feedback report (or ACK) packet is received from network nodes or from the receiver. Feedbacks can be implicit, such as timeouts or duplicate acknowledgements (DUPACKs), or explicit such as Explicit Congestion Notification (ECN).

Another approach addressing the issue of implementing a rate-based congestion control is presented in RFC 3448 where a send loop is proposed to implement the rate-based TCP Friendly Rate Control (TFRC) algorithm.

The algorithm is based on that employed by RAP, but it considers for the first time the uncertainty of the inter-packet intervals $t_{ipi}$ due to the fact that the send loop process shares the CPU with other processes. In particular, RFC 3448 tries to counteract the effect of imprecise timer duration by sending a packet without waiting for all the inter packet interval in the case this interval has elapsed except that for an amount equal to Δ computed as $$\Delta = \min\left(\frac{t_{ipi}}{2}, \frac{t_g}{2}\right),$$

where $t_g$ is the operating system scheduler granularity. We interpret this design choice as a heuristic aiming at anticipating the packet sending time to compensate when the sending times are delayed due to imprecise timers.

Even though such a mechanism seems to be able to efficiently solve the issue of rate-based data sending, the produced (or actuated) rate does not match the desired one computed by the congestion control algorithm.

In fact, even though TFRC is going through the IETF standardization process since January 2003, the Master Thesis by A. Saurin (see Alvaro Saurin, "Congestion Control for Video-conferencing Applications", MSc Thesis, University of Glasgow, December 2006), advised by Prof. Colin Perkins (University of Glasgow), shows that the mechanism described in RFC 3448 is not able to efficiently and precisely generate the sending rate computed by a rate-based congestion control algorithm.

For these considerations, the implementation of a rate-based congestion control algorithm is an open issue at this time.

When window-based congestion control algorithms are used, packet pacing is a packet sending technique that can be employed in order to approximate a rate-based behaviour. Basically, packet pacing applied to window-based congestion control mechanisms such as the Transmission Control Protocol (TCP), consists in sending a window worth of packets by adequately spacing them in order to provide a rate-based packet sending.

In fact, it is well-known that TCP sends new packets when an acknowledgement (ACK) packet is received, i.e. TCP is ack-clocked. In particular, on ACK reception the TCP congestion control algorithm sends an amount of packets equal to:

$\Delta W = cwnd - \text{outstanding}$ where cwnd is the congestion window and outstanding represents the number of in flight packets, i.e. the number of un-acknowledged packets.

When the amount of data ΔW to be sent is large, the performances of the congestion control mechanism are affected as much as the router buffers are small. When the packet pacing mechanism is employed, the number of packets ΔW is not immediately sent as a whole on ACK reception, but it is sent one packet at a time by adequately spacing the packets. It worth noting that the amount of data ΔW must be sent in at most RTT seconds, otherwise the average rate generated by employing packet pacing technique would be less than the one achieved by window-based sending. For this reason, in order to evaluate the correct temporal duration of inter-packet gaps, an estimate of the value of the current round trip time is needed.

To summarize, packet pacing techniques applied to window-based congestion control mechanism rely on timers in order to schedule packet sending as in the case of rate-based algorithms, thus experiencing all the problems we have described above.

BRIEF SUMMARY OF THE INVENTION

It is a general object of the present invention to provide a solution to the problem of actuating rate-based packet sending over a packet switched network.

More precisely, this invention describes an innovative send loop or "actuator" 13, which is in charge of scheduling packets queued in the transmission buffer to be sent at the specified rate $r_c(t)$ 12, once the sending rate $r_c(t)$ is dynamically computed by a rate-based or window-based congestion controller 11.

Figure 1:
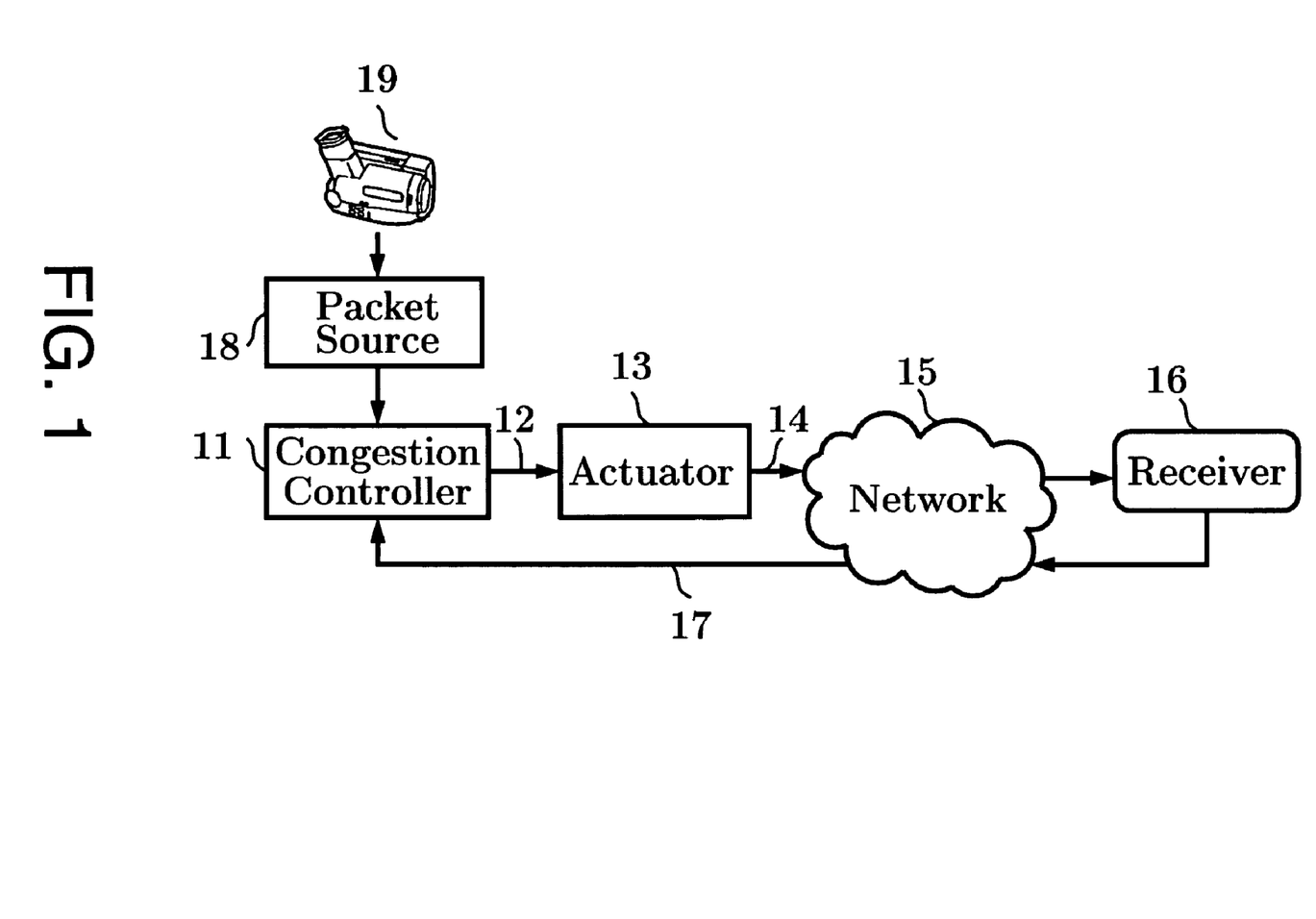
FIG. 1 is a representative system in which the present invention is implemented.

The general setting where this invention can be used is shown in FIG. 1. An end-to-end communication application 19, such as an audio/video communication software, generates bytes that are packetized 18 to be sent to a receiver 16. A congestion control mechanism 11 computes a sending rate 12 that aims at matching the unknown bandwidth available over packet communication network 15 such as the Internet. The actuator 13 has the task of generating an effective sending rate 14 that is equal to the computed one 12. The receiver 16 represents the receiver end of a two-way symmetrical communication. The receiver can generate and send feedback packets, which contain feedback information such as received rate and/or packet loss ratio, to the congestion controller 11 using the feedback channel 17.

Figure 2:
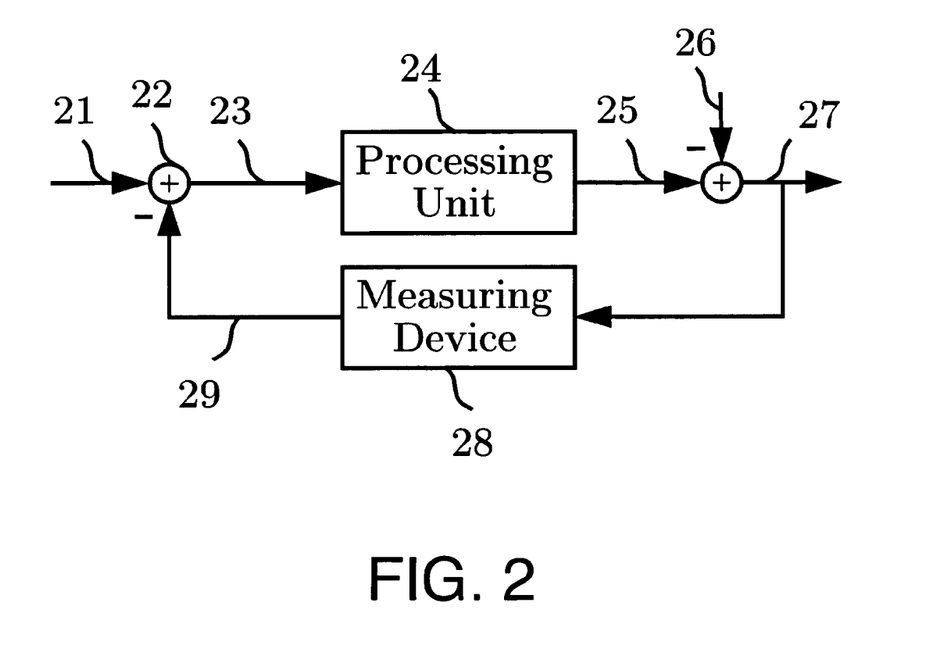
FIG. 2 is a representation of the actuator designed for implementing rate-based sending.

The innovative mechanism object of this invention is the actuator 13. The actuator is depicted in FIG. 2, which shows an innovative feedback mechanism to implement a rate-based sending process in a general purpose Operating Systems such as Windows™, Linux™, Symbian™, Mac OS™, Vista™, Android™, Palm OS™ etc.

The invention can be used for multimedia content delivery such as in the case of Video on Demand (VoD), Video Conference, Voice over IP (VoIP), IP TV, Digital Broadcast IP, Video over IP, real-time data delivery, in the context of a classic client-server or peer-to-peer communication paradigm over packet switched networks such as the Internet. In general, the invention can be employed whenever a rate-based sending protocol over a packet switched network needs to be implemented because delays and jitters reductions are of importance. This invention can also be applied to implement depletion of a queue of processes at a given time-varying depletion rate.

It is important to notice that the employment of the mechanism described in this invention does not depend on the particular congestion control mechanism or transport protocol employed. It is also noteworthy that the impact of the invention described in this document becomes more and more relevant when applications generate a very high rate or when the device running such applications is characterized by limited processing resources such as in the case of handheld devices, Internet tablets, or mobile phones.

Consequently, this invention is particularly important in the context of standard or high definition and 2K/4K video delivery over packet switched networks. It is also important in high-speed networks such as Gigabit wide are networks or local area networks in the case of backups in Data Centers.

This invention is based on a time-sampled feedback loop and a digital controller that is able to accurately produce a rate-based flow at the rate given by a generic congestion control algorithm. The invention can be used both in the case the congestion control algorithm is rate-based or window-based.

In particular, in the case the congestion control algorithm is rate-based, the time varying data sending rate evaluated by the congestion control algorithm $r_c(t)$ is acquired and compared with the measured sending rate $r_m(t)$ effectively produced by the application. The difference between $r_c(t)$ and $r_m(t)$ enters as input of a functional that computes the actuation rate $r_a(t)$ which provides an effective sending rate $r_e(t)$ that matches the desired sending rate $r_c(t)$.

In the case of a window-based mechanism, the congestion control algorithm specifies the amount of data that should be sent on ACK reception. In the following it will be described how the mechanism object of this invention can be employed to produce rate-based packet sending that mitigates the burstiness that is inherent to window-based protocols.

The invention herein disclosed can be also employed in a generic resource allocation problem where, a generic resource such as channel bandwidth, CPU or memory, requires to be allocated at the desired rate $r_c(t)$ measured in resource units per time unit. In this case the role of a packet sent over the network is played by a queued request being served.

An example is a server that needs to drain a queue of requests at a specified rate, such as in the case of an Apache™ or Microsoft Internet Information Services IIS™ web server, and in the case of a SIP server such as Sip Express Router (SER).

The foregoing has outlined some of the more pertinent features of the present invention. Other features and a fuller understanding of the invention can be found in the Section Description of the Preferred Embodiment.

BRIEF DESCRIPTION OF THE DRAWINGS

For a more complete understanding of the present invention and the advantages thereof, reference should be made to the following Description of the Preferred Embodiment taken in connection with the accompanying drawings in which.

DESCRIPTION OF THE PREFERRED EMBODIMENT

A client-server or peer-to-peer communication over a packet switching network, such as the Internet, is illustrated in FIG. 1, which shows the functional blocks of one side of an end-to-end communication that is symmetrical and bidirectional.

The application 19 can be a Desktop Video Conference, a high-quality VoIP, an IP Television channel, an IP Digital Video Broadcast Channel, a video-chat, a streaming video. Bytes generated by the application are packetized by 18. A congestion controller 11 computes the sending rate that matches the unknown bandwidth available in the packet network 15 based on the feedback 17 received from the receiver 16 that represents the receiver side of the application. The actuator 13 represents the invention herein disclosed that is in charge of actuating the rate 12 computed by 11 in a general purpose operating system such as Symbian™, Vista™, Windows™, Mac OS™, Andorid™, Palm OS™, Linux™.

Before starting to describe the invention object of this document, we provide a definition of the term rate-based as it will be intended in this description.

Definition of the term rate-based: in this invention the term "rate-based control" refers to a controller that evaluates for each sampling time the rate $r_c(t_k)$, where $T_s$ is the sample period and $t_k = kT_s$ refers to the k-th sample time. Then, the amount of data to be sent at the current sampling time $t_k$ is $$d(t_k) = r_c(t_k) \cdot T_s \text{ or } d(t_k) = \frac{[r_c(t_k) + r_c(t_{k-1})]}{2} T_s$$

or any other equivalent value obtained by employing any quadrature rule. It is important to notice that, being the packets a discrete quantity, the concept of rate-based mechanism is to be intended as the limit of a window-based mechanism, where the window represents the amount of data $d(t_k)$ to be sent during the time interval $T_s$, when $T_s$ approaches to zero. For this reason, a rate-based sending mechanism can be approximated through a window-based mechanism, being this approximation as more accurate as the sampling period $T_s$ gets smaller.

Section 1 describes the invention when it is employed with a rate-based congestion control mechanism 11, whereas Section 2 describes the invention when 11 is a window-based controller. Section 3 describes the invention in the case a queue of requests needs to be drained at a specific service rate.

1. Description of the Invention when Used with a Rate-based Congestion Control Algorithm The novelty described in this invention is the actuator 13 shown in FIG. 1. Packets generated by the source 18 are supposed to be sent at a packet sending rate $r_c(t)$ 12 computed by a rate-based congestion controller 11, which aims at matching the unknown bandwidth available in the network 15.

An example of a rate-based congestion control is the TFRC (described in RFC 3448), the RAP (described in R. Rejaie, M. Handley, D. Estrin, "RAP: An End-to-end Rate-based Congestion Control Mechanism for Realtime Streams in the Internet", in Proc of IEEE INFOCOM '99, March 1999) or the rate-based congestion controller described in US patent appl. Number 20070165524 "Rate based congestion control for packet networks".

The actuator 13 that is shown in detail in FIG. 2 must implement a mechanism to produce an actuation rate 25 so that the effective packet sending rate 27 is equal to the desired rate 21 evaluated by the rate-based congestion controller 11 in the presence of the disturbance 26, which models timing errors due to the fact that the sending process shares the CPU with other processes.

As we have already noticed, this issue is not simple and has not been addressed up to now. In fact, the effective sending rate 27 will differ from the computed rate 21 since a disturbance 26 acts on the actuator that is due to the fact that the application sending the packets shares the CPU with other processes.

The actuator employed in this invention, differently from the mechanism presented in the RFC 3448, is executed every sampling interval $T_s$. It is worth to notice that, in order for the actuator to produce an input rate with a burstiness that is lower than that produced by a window-based algorithm, the actuator must select a sampling time $T_s = RTT_{min}/N$ that is a fraction of the estimated minimum RTT, for instance with N=4.

The actuator described in the present invention, is based on the following components:
- a first device acquires the rate $r_c(t)$ 21 computed by the rate-based congestion controller;
- a second device 28 measures the effective sending rate $r_e(t)$ 27 and provides the measured rate $r_m(t)$ 29;
- a comparing unit 22 evaluates the mismatch $e(t) = r_c(t) - r_m(t)$ 23 between the computed rate $r_c(t)$ 21 and the measured rate $r_m(t)$ 29;
- a processing unit 24 evaluates the actuation rate $r_a(t)$ 25 as a functional of the said mismatch 23.

It should be noted that the input 12 in FIG. 1 is the input 21 shown in FIG. 2 and that the output of the actuator 14 in FIG. 1 is the output 27 shown in FIG. 2.

As it is shown in FIG. 2, the rate effectively sent $r_e(t)$ 27 is affected by a disturbance rate $r_d(t)$ 26 that is due to the interactions between the actuator and other processes sharing the CPU. It is important to notice that the disturbance 26 illustrated in FIG. 2 models a disturbance on the sampling interval $T_s$. In particular, in a general purpose Operating System running the send loop process, the scheduled timer used to implement the sampling time $T_s$ will be affected by a disturbance $t_w \geq 0$ so that the actual duration will be $T_s + t_w$. Since the data to be sent in the k-th sampling time are equal to $d(t_k) = r_c(t_k)T_s$, but they have actually been sent during a period equal to $T_s + t_w$, the effective rate 27 produced by the actuator will be equal to $$r_e(t_k) = \frac{d(t_k)}{T_s + t_w} = r_c(t_k) \frac{T_s}{T_s + t_w}.$$

Hence, unless $t_w$ is not zero, it turns out $r_e(t_k) < r_c(t_k)$, i.e. the actuator is not able to sustain the desired sending rate computed by the congestion controller 11.

The objective of the invention presented herein is the compensation of the equivalent disturbance $r_d(t)$ 26 in order to obtain an effective rate 27 that is as much as possible close to the computed rate 21. Towards this end, a comparing unit 22 evaluates the error $e(t) = r_c(t) - r_m(t)$ that is routed to the input port of the processing unit 24 that evaluates the actuation rate $r_a(t)$ 25 as a functional $\Phi(\cdot)$ of the error 23 as follows:

$$r_a(t) = \Phi(r_c(t) - r_m(t))$$

A functional $\Phi(\cdot)$ is a mapping from a function of a time to a function of time. An example of a functional is the input-output relationship of a linear time invariant dynamical systems described by an ordinary differential equation. Other examples are linear time varying systems or nonlinear dynamical systems.

Figure 5:
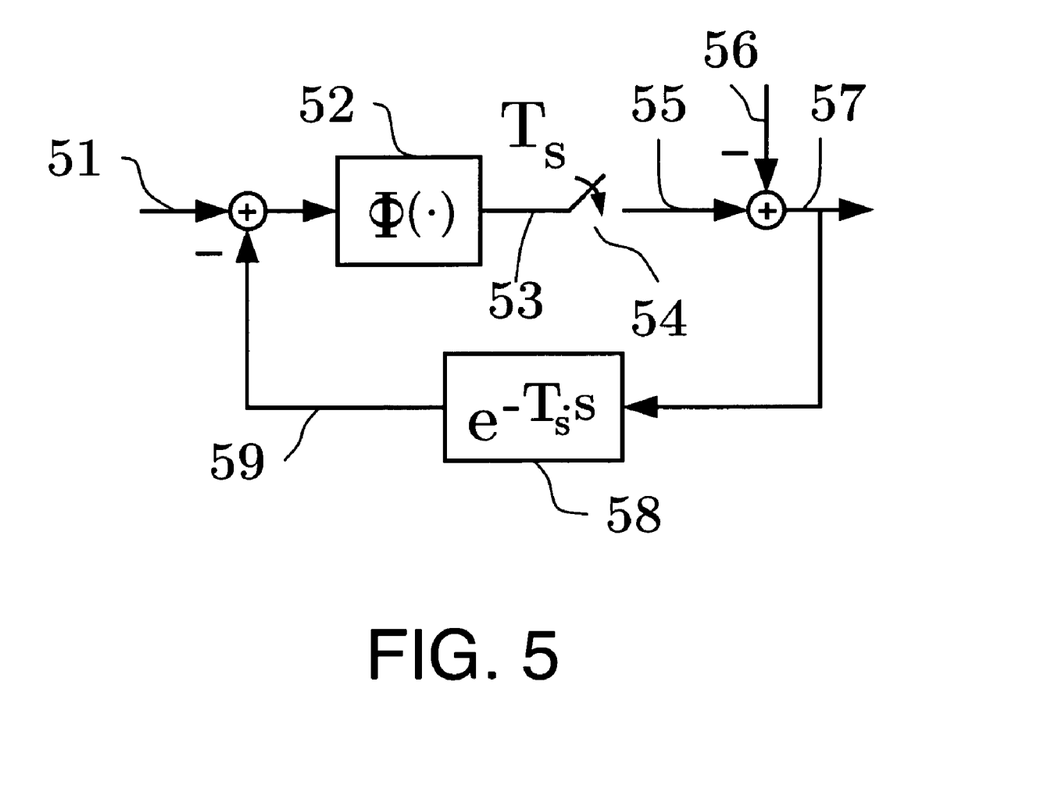
FIG. 5 is a detailed block diagram of the actuator designed for implementing rate-based sending.

In order to give a better understanding of the way the actuation rate is actually produced, FIG. 5 shows a detailed block diagram of the actuator object of this invention.

The input of the actuator is the rate $r_c(t)$ 51 that is computed by the congestion controller, whereas the output of the actuator is the effective rate $r_e(t)$ 57.

The actuation rate $r_a(t) = \Phi(r_c(t) - r_m(t))$ 53 is computed using the functional $\Phi(\cdot)$ 52. The actuation rate is produced by the network interface as follows. For every sampling instant $t_k = kT_s$, the amount of data $\Delta(t_k)$ is evaluated as:

$$\Delta(t_k) = r_a(t_k)T_s$$

and sent instantaneously at time $t = t_k$. This behaviour can be modeled using an impulsive sampler 54 with sampling period $T_s$.

The output of the sampler, i.e. the sampled actuation rate $r_a^*(t)$ 55, is given by:

$$r_a^*(t) = \sum_{i=0}^{N(t)} \Delta(t_k)\delta(t - t_k) = T_s \sum_{i=0}^{N(t)} r_a(t_k)\delta(t - t_k)$$

where $N(t) = \text{card}(\{t_k | t_k < t\})$.

However, since the amount of data $\Delta(t_k)$ is actually sent in $T_s + t_w$ seconds, it turns out that the effective rate 57 is equal to $$r_e(t_k) = \frac{\Delta(t_k)}{T_s + t_w} \leq r_a(t_k).$$

The mismatch between the effective rate $r_e(t_k)$ and the actuation rate $r_a(t_k)$ is modeled by the disturbance $r_d(t_k)$ 56. Finally, the time-delay block 58 models the fact that the measuring device 28 introduces a time-delay $T_s$. In fact, the effective rate $r_e(t)$ 57 generated by the actuator can be measured only after one sampling time $T_s$, so that the measured rate $r_m(t)$ 59 is equal to the signal $r_e(t)$ 57 shifted by $T_s$, i.e. $r_m(t) = r_e(t - T_s)$.

In the following it is provided an example of a particular functional $\Phi(\cdot)$ to implement an effective controller that aims at steering to zero the error $e(t) = r_c(t) - r_m(t)$.

1.1 Implementation of the Actuator when Used with a Rate-based Controller

A possible implementation of the invention described above can be obtained using an integral control law, i.e. by means of the following functional:

$$\Phi[f] = \int_0^t f(\tau)d\tau$$

In particular, the actuator implements the following control law in the continuous time domain since the initial time t=0:

$$r_a(t) = K\int_0^t e(\tau)d\tau = K\left(\int_0^t r_c(\tau)d\tau - \int_0^t r_m(\tau)d\tau\right) \quad (1)$$

this is:

$$r_a(t) = K(d_c(t) - d_m(t)) \quad (2)$$

It should be noted that the integral of the measured rate $r_m(t)$ is equal to the total number of bytes $d_m(t)$ sent since the beginning of the connection, i.e.

$$d_m(t) = \int_0^t r_m(\tau)d\tau.$$

This integral is already known at any time instant t, because it corresponds to the data that have been effectively sent until time t. The integral of the computed rate $r_c(t)$ is equal to the total number of bytes that should be sent since the beginning of the connection in according to the congestion controller, i.e.

$$d_c(t) = \int_0^t r_c(\tau) d\tau.$$

To discretize this integral a generic quadrature formula can be used.

The simplest way to discretize such integral is to use the following formula:

$$d_c(t_k) = d_c(t_{k-1}) + r_c(t_k) T_s \quad (3)$$

In order to implement this control law, it is necessary to discretize Eq. (2). Thus, the control law in discrete time is:

$$r_a(t_k) = K(d_c(t_k) - d_m(t_k)) \quad (4)$$

In the following we show that the actuator whose control law is expressed by (4) gives a stable system if and only if $K<2/T_s$ and it is able to reject step-like disturbances.

Figure 6:
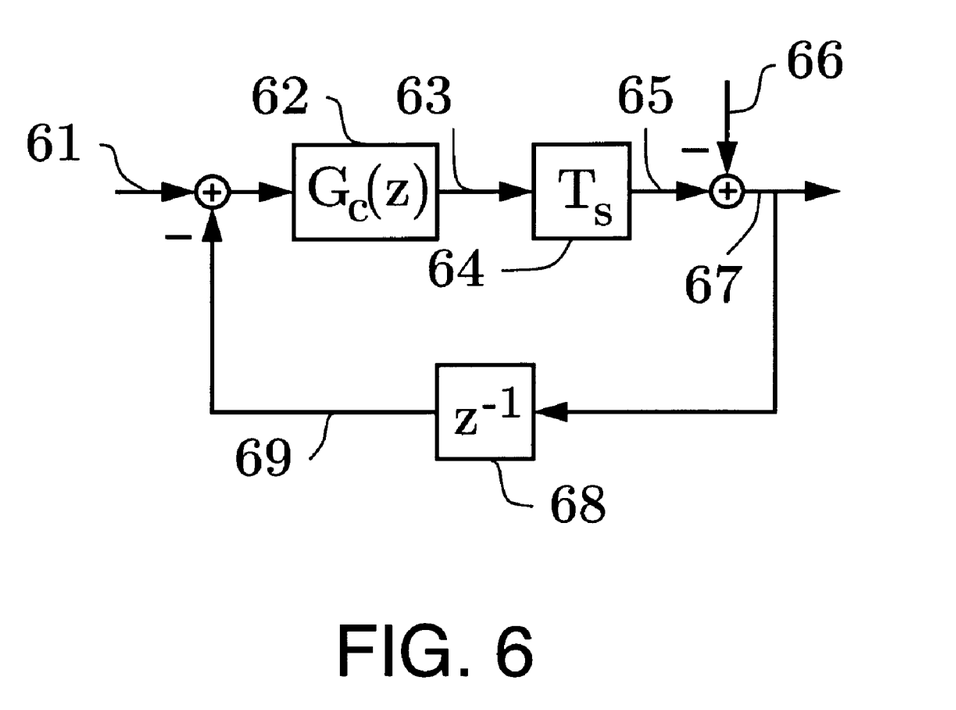
FIG. 6 is a detailed block diagram of the actuator designed for implementing rate-based sending in the time discrete domain.

In order to prove that (4) gives a stable system, let us consider FIG. 6 that is the digital block diagram of the actuator obtained by discretizing the time-continuous system shown in FIG. 5.

In the following we denote the Z-transform of the signal x(t) as X(z), where z is the discrete complex variable.

The input of the actuator is the rate computed by the congestion controller $R_c(z)$ 61, whereas the output of the actuator is the effective rate $R_e(z)$ 67.

The Z-transfer function $G_c(z)$ 62 corresponding to the time continuous functional (1) is given by:

$$G_c(z) = \frac{R_a(z)}{E(z)} = \frac{K}{1 - z^{-1}}$$

that is obtained by discretizing the control law (1). The input of the controller 62 is the error $E(z) = R_c(z) - R_m(z)$, whereas its output 63 is the actuation rate $R_a(z)$. The impulsive sampler 54 corresponds in the time-discrete domain to the gain $T_s$ 64. $R_e(z)$ 67 is the Z-transform of the effective rate $r_e(t)$ 57 that is equal to $R_a(z) - R_d(z)$, where $R_d(z)$ is the disturbance 66 that acts on the actuator. The continuous time delay 58 corresponds in the discrete domain to a delay of one sampling interval, which is modeled by the transfer function $z^{-1}$ 68.

It is well-known that a discrete linear time invariant system is asymptotically stable if all its poles lie in the unity circle. In this case, the transfer function of the closed loop system is given by:

$$G_0(z) = \frac{R_m(z)}{R_c(z)} = \frac{T_s K}{z - 1 + T_s K}$$

Thus, the system has one pole in $p = 1 - KT_s$. By imposing $|p|<1$, it turns out:

$$0 < K < 2/T_s$$

This concludes the proof.

In order to prove that the actuator described in the present embodiment is able to reject step disturbances $R_d(z)$ 66, we compute the Z-transfer function between $R_d(z)$ and $R_e(z)$:

$$\frac{R_e(z)}{R_d(z)} = \frac{z-1}{z-1+KT_s}$$

By employing the final value theorem (provided the system is stable, i.e. $K<2/T_s$), we can find the steady state effect of the disturbance 66 on the output of the actuator 67:

$$r_e(\infty) = \lim_{k \to \infty} r_e(t_k) = \lim_{z \to 1} \frac{z-1}{z} R_e(z) = \lim_{z \to 1} \frac{z-1}{z} \frac{z-1}{z-1+KT_s} R_d(z)$$

Since we are considering step disturbances:

$$R_d(z) = \frac{z}{z-1}$$

Thus, it turns out:

$$r_e(\infty) = \lim_{z \to 1} \frac{z-1}{z} \frac{z-1}{z-1+KT_s} \frac{z}{z-1} = \lim_{z \to 1} \frac{z-1}{z-1+KT_s} = 0$$

that concludes the proof.

In the following we report the pseudo-code of the actuator:
Initialization:
   1: data_calc=MTU
   2: data_sent=0
Each t_k:
   3: data_calc=get_from_first_device( )
   4: data_sent=get_from_second_device( )
   5: error=data_calc−data_sent
   6: actuation_rate=K*error
   7: data_to_send=T_s*actuation_rate
   8: send (data_to_send)
   9: data_sent=data_sent+data_to_send It is important to notice that all the variables defined in the pseudo-code are measured in bytes. The variable "data_calc" corresponds to $d_c(t)$, whereas the variable "data_sent" corresponds to $d_m(t)$. Furthermore, the actuation rate $r_a(t)$ is computed in Line 6 by employing (4) and the amount of data to be sent "data_to_send" in the current sampling interval is evaluated in Line 7 by multiplying the actuation rate "actuation_rate" with the sampling time $T_s$.

We conclude the description of this particular embodiment by presenting an experimental evaluation of the actuator herein described.

Figure 7:
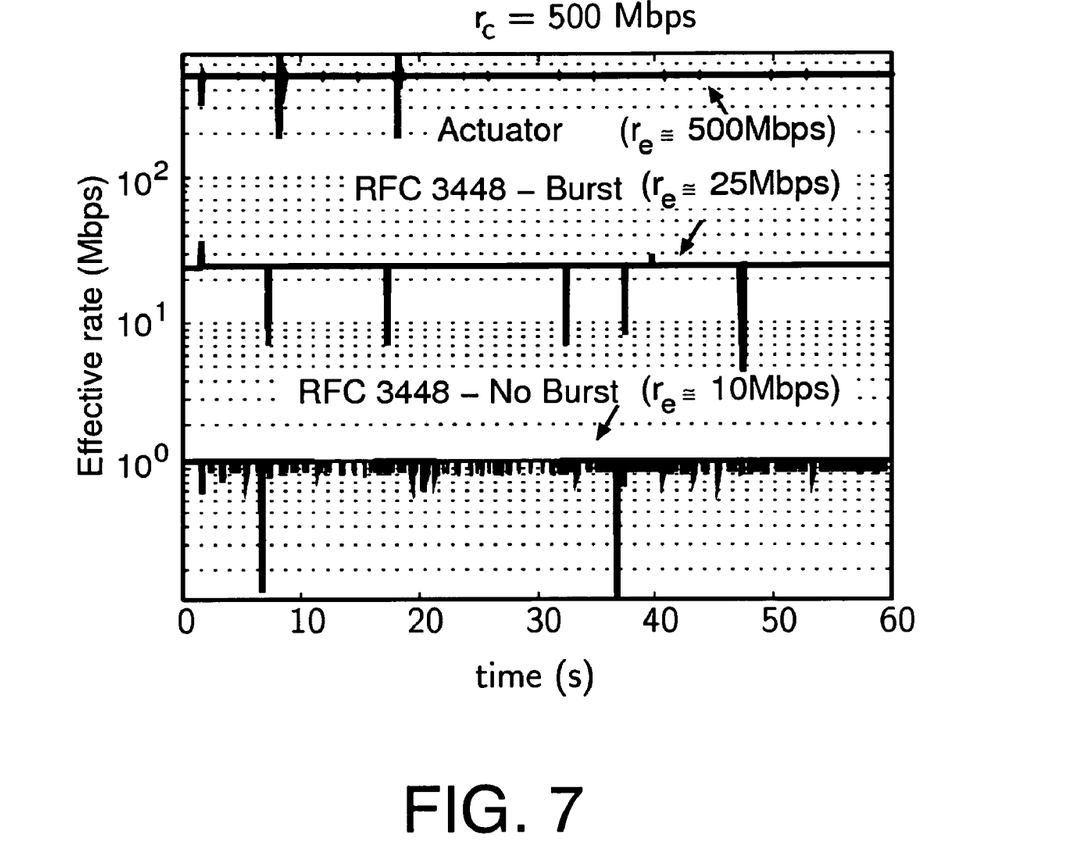
FIG. 7 shows an experimental performance evaluation of the actuator herein described.

FIG. 7 shows the effective rate time evolutions produced by three different sending loops when a required constant rate $r_c$=500 Mbps is set by the rate-based congestion controller. The experiments have been run using a send loop implemented in user space and executed on a Linux Kernel version 2.6.19.

The time evolution marked with "Actuator" refers to the dynamics obtained using the Actuator described in this invention. The time evolution marked with "RFC 3448—No burst" refers to the dynamics obtained by using the send loop described in RFC 3448 in the case no burst are sent when the inter-packet interval $t_{ipi}$ is less than the timer granularity $t_g$. The time evolution marked with "RFC 3448—Bursts" refers to the dynamics obtained using the send loop described in RFC 3448 where bursts of size $r_c(t)t_g$ are sent equally spaced by $t_g$, in the case $t_{ipi}$ is less than $t_g$. It should be noticed the logarithmic scale of the y-axis in FIG. 7.

FIG. 7 clearly shows that the Actuator described in this invention is able to produce an effective rate at 500 Mbps that precisely matches the sending rate $r_c(t)$ computed by the congestion controller. On the other hand "RFC 3448—No Burst" provides an effective sending rate of only 10 Mbps (i.e. 1/50 of the desired rate), whereas "RFC 3448—Bursts" gives an effective rate of only 25 Mbps (i.e. 1/20 of the desired rate).

2. Description of the Invention when Used with a Window-based Congestion Control Algorithm We have described the invention in the case the congestion control algorithm 11 is rate-based. The designed control law (4) is able to produce a measured rate 29 that matches the rate 21 computed by the congestion controller 11.

The invention herein described can be employed also in the case the controller 11 is window-based so that a rate-based sending can be implemented in this case too. When dealing with a window-based congestion controller, as in the case of TCP, the amount of data $\Delta W$ is immediately sent at the reception of an ACK packet, a DUPACK (duplicate ACK) or a cumulative ACK. In this case, rate-based can be achieved by sending the amount of data $\Delta W$ one packet at a time by adequately spacing packets in order to mitigate burstiness. This mechanism is referred to as packet pacing.

By letting $t_i$ be the time instant of the reception of the i-th ACK, it is possible to model the amount of data $\Delta W(t_i)$ to be sent as a Dirac impulse acting at time instant $t_i$ with an amplitude $\Delta W(t_i)$. Thus, window-based congestion controller generates a sending rate that can be modelled using a train of Dirac impulses as follows:

$$r_c(t) = \sum_{i=0}^{N(t)} \Delta W(t_i)\delta(t - t_i) \quad (5)$$

with:

$$N(t) = \text{card}(\{t_i \mid t_i < t\})$$

being the number of received ACKs until the time instant t.

It is important to notice that in this case the actuator needs to produce, for each impulses of area $\Delta W(t_i)$, a train of impulses of smaller area $dW_j(t_i)$ but with the constraint $\Delta W(t_i) = \Sigma_j dW_j(t_i)$.

For this reason, instead of considering $r_c(t)$ as a reference signal, its integral is considered as follows:

$$d_c(t) = \int_0^t r_c(\tau)d\tau = \sum_{i=0}^{N(t)} \int_0^t \Delta W(t_i)\delta(\tau - t_i)d\tau = \sum_{i=0}^{N(t)} \Delta W(t_i) \quad (6)$$

and instead of considering the measured rate $r_m(t)$ 29, its integral $d_m(t)$ is considered as feedback signal 29, which represents the amount of data sent until the time instant t.

Note that (6) can be written in a much simpler form as follows:

$$d_c(t_i) = d_c(t_{i-1}) + \Delta W(t_i) \quad (7)$$

considering that a window-based congestion control mechanism sends new packets clocked to the arrival of an ACK packet at time $t_i$. Furthermore, it is clear that the signal $d_c(t)$ remains constant between two consecutive ACKs.

The actuator, as in the rate-based case discussed in Section 1, employs a sampling period. It is important to notice that, in order for the actuator to produce a data rate that is characterized by a burstiness that is lower with respect to that produced by a window-based algorithm, the actuator must select a sampling time $T_s$ that is a fraction of the estimated minimum round trip time (RTT), for instance $T_s = RTT_{min}/N$ with N greater than 4.

The actuator described in the present invention, in the case of window-based congestion controllers, is based on the following components:

- a first device acquires the quantity of data $d_c(t)$ 21 (see Eq. (7)) produced by the window-based controller;
- a second device 28 measures the quantity of data effectively sent $d_e(t)$ 27 and provides the measured data sent $d_m(t)$ 29;
- a comparing unit 22 evaluates the mismatch $e(t) = d_c(t) - d_m(t)$ 23 that exists between the quantity of data produced by 11 $d_c(t)$ and the quantity of measured data sent $d_m(t)$ 29;
- a processing unit evaluates the quantity $d_a(t)$ 25 of data to be sent during the k-th sampling interval as a functional of said mismatch 23.

The objective of the invention presented herein, in the case of a window-based congestion control algorithm 11, is to achieve an effective rate 27 that is less bursty that the one generated by a window-based actuator, while bounding the error 23 $e(t) = d_c(t) - d_m(t)$. Towards this end, a comparison unit 22 evaluates the error 23 $e(t) = d_c(t) - d_m(t)$ that is routed to the input port of the processing unit 24 that evaluates the quantity of data to be sent $d_a(t)$ 25 as a functional of the error as follows:

$$d_a(t) = \Phi(d_c(t) - d_m(t))$$

In the following it is provided an example of a particular functional $\Phi$ to implement an effective controller that aims at steering to zero the error $e(t) = d_c(t) - d_m(t)$.

2.1 Implementation of the Actuator when Using a Window-based Controller

A possible implementation of the invention described above is based on the employment of a proportional control law, i.e. using the following function:

$$\Phi(d_c(t) - d_m(t)) = K(d_c(t) - d_m(t))$$

where K is a real positive constant. In particular, the control law of the actuator 24 can be written as follows in the time continuous domain:

$$d_a(t) = K(d_c(t) - d_m(t)) \quad (8)$$

Notice that in this case the discretization of (8) using a $T_s$ sample interval turns into:

$$d_a(t_k) = K(d_c(t_k) - d_m(t_k)) \quad (9)$$

It is simple to show that the actuator whose control law is expressed by Eq. (9) is able to reject step-like disturbance at steady state and that (8) produces a stable system if and only if K<2.

3. Description of the Invention in the Case a Queue Requires to be Drained at a Specific Rate In the two embodiments described above, the invention has been employed to send packets at a rate specified by a generic congestion controller over a packet switching network.

The same invention herein disclosed can be also employed in a resource allocation problem where, a generic resource such as channel bandwidth, CPU or memory, needs to be allocated at the desired rate $r_c(t)$ measured in resource units per time unit.

Figure 8:
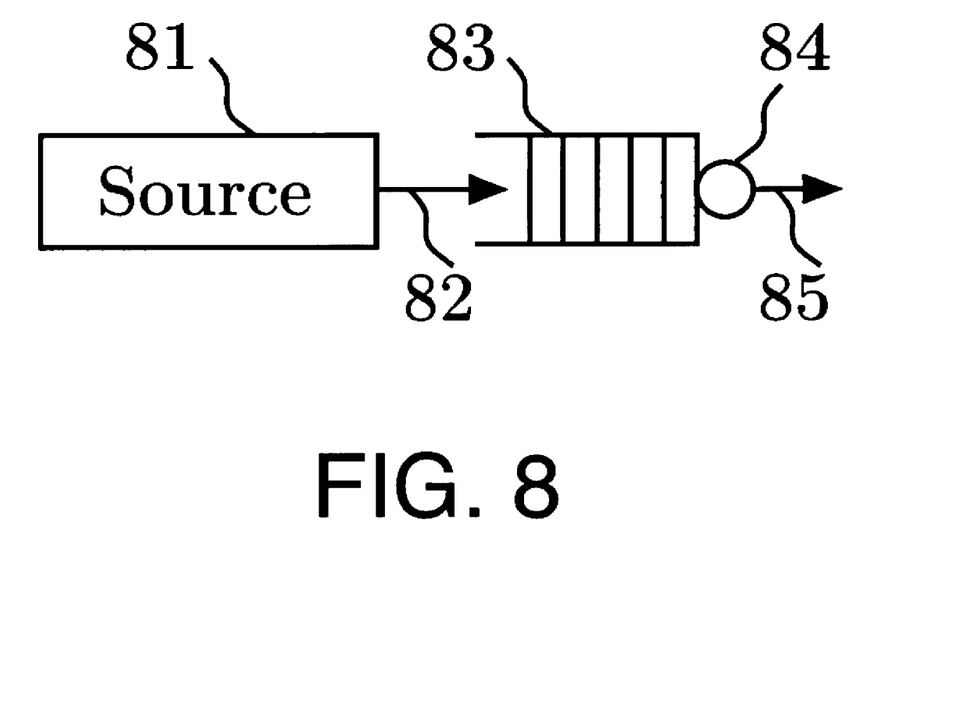
FIG. 8 is another representative system in which the present invention is implemented.

FIG. 8 shows a generic resource 84 which serves a queue 83 of elements waiting for service. The elements that arrive at a rate $r_f(t)$ 82 produced by a source 81 are queued in 83 to be served at the effective rate $r_e(t)$ 85. Also in this case, the Actuator object of this invention and shown in FIG. 2 must guarantee that the effective rate 85 (that corresponds to 27) matches the desired rate $r_c(t)$ 21.

A typical scenario is a computer application when a "buffer" or "queue" has to be drained at the desired rate $r_c(t)$ 21. In this case, a buffer 83 that is fed by a first process $P_1$ 81 at a rate $r_f(t)$ 82, needs to be drained at a required rate $r_c(t)$ 21. An example is a server that needs to drain a queue of requests, such as in the case of a Web server, a SIP server, at a specified rate.

Another possible scenario is that of a mechanism required to compute and actuate a draining rate $r_c(t)$ 21 to track a buffer level q(t) regardless the rate $r_f(t)$ that feeds the buffer, such as in the case of a multimedia application.

Since the Actuator process shares the CPU with other processes, an equivalent disturbance $r_d(t)$ affects the draining rate $r_e(t)$ effectively produced by the actuator. In order to reject the disturbance $r_d(t)$ so that the effective rate $r_e(t)$ matches the computed draining rate $r_c(t)$, we design an Actuator based on the following components:

- a first device that acquires the desired rate $r_c(t)$ 21 to drain the queue;
- a second device 28 that measures the effective rate $r_e(t)$ 27 and provides the measured rate $r_m(t)$ 29;
- a comparing unit 22 that evaluates the mismatch $e(t)=r_c(t)-r_m(t)$ 23 between the computed rate $r_c(t)$ 21 and the measured rate $r_m(t)$ 29;
- a processing unit 24 that evaluates the actuation rate $r_a(t)$ 25 as a functional of the said mismatch 23.

The objective of the invention presented herein is the compensation of the equivalent disturbance $r_d(t)$ 26 in order to obtain an effective rate 27 that is as much as possible close to the computed rate 21. Towards this end, a comparing unit 22 evaluates the error $e(t)=r_c(t)-r_m(t)$ that is routed to the input port of the processing unit 24 that evaluates the actuation rate $r_a(t)$ 25 as a functional $\Phi(\bullet)$ of the error 23 as follows:

$$r_a(t)=\Phi(r_c(t)-r_m(t))$$

A possible implementation of the invention can be obtained using the functional $\Phi(\bullet)$ described in Section 1.1 that is able to reject step-like disturbances $r_d(t)$.

What is claimed is:

1. A system for packet sending every time instant $t_k$, multiple of a sampling time $T_s$, over a packet-switched communication network at a sending rate $r_c(t_k)$ dynamically set by a rate-based congestion controller comprising:
   - a first device which reads the sending rate $r_c(t_k)$ computed by said rate-based congestion controller, and generates an output;
   - a second device that reads an effective sending rate $r_m(t_k)$ from a measurement device, and generates an output;
   - a comparing device that computes a difference between the output of the first and the second devices;
   - a processing unit computing an actuation sending rate $r_a(t_k)$ as a function of the difference computed by said comparing device.

2. A system for packet sending every time instant $t_k$, multiple of a sampling time $T_s$, over a packet-switched communication network at a sending rate $r_c(t_k)$ dynamically set by a rate-based congestion controller comprising:
   - a first device that computes an amount of data to be sent $d_c(t_k)$ by integrating the sending rate $r_c(t_k)$ provided by said rate-based congestion controller, and generates an output;
   - a second device that reads an amount of data $d_m(t_k)$ effectively sent from a measurement device, and generates an output;
   - a comparing device that computes a difference between the output of the first and the second devices;
   - a processing unit computing an actuation sending rate $r_a(t_k)$ as a function of the difference computed by said comparing device.

3. The system according to claim 1, wherein the processing unit computes the actuation sending rate $r_a(t_k)$ as an output of a linear or non-linear, time invariant or time varying difference or differential equation whose input is the difference computed by said comparing device.

4. The system according to claim 2, wherein the processing unit computes the actuation sending rate $r_a(t_k)$ proportionally to the difference computed by said comparing device.

5. The system according to claim 2, wherein the processing unit computes the actuation sending rate $r_a(t_k)$ as an output of a difference equation whose input is the difference computed by said comparing unit.

6. A system for actuating a rate-based packet sending every time instant $t_k$, multiple of a sampling time $T_s$, over a packet-switched communication network comprising:
   - a first device that reads an amount of data to be sent $d_c(t_k)$ as computed by a window-based congestion controller, and generates an output;
   - a second device that reads an amount of data effectively sent $d_m(t_k)$ from a measurement device, and generates an output;
   - a comparing device that computes a difference between the output of the first and the second devices;
   - a processing unit that computes an amount of data $d_a(t_k)$ to be sent at a current sampling time based on the difference computed by said comparing device.

7. The system according to claim 6, wherein the processing unit computes the amount of data $d_a(t_k)$ to be sent proportionally to the difference computed by said comparing device.

8. The system according to claim 6, wherein the processing unit computes the amount of data $d_a(t_k)$ to be sent as an output of a difference equation whose input is the difference computed by said comparing device.

9. A system for serving, every time instant $t_k$ multiple of a sampling time $T_s$, a queue of requests at a dynamically set rate $r_c(t_k)$ comprising:
   - a first device that acquires the rate $r_c(t_k)$ to drain the queue, and generates an output;
   - a second device that reads an effective sending rate $r_m(t_k)$ from a measurement device, and generates an output;
   - a comparing device that computes a difference between the output of the first and the second devices;
   - a processing unit computing an actuation sending rate $r_a(t_k)$ as a function of the difference computed by said comparing device.

10. A system for serving, every time instant $t_k$ multiple of a sampling time $T_s$, a queue of requests at a dynamically set rate $r_c(t_k)$ comprising:
    - a first device that computes a number of requests to be served $d_c(t_k)$ by integrating the rate $r_c(t_k)$, and generates an output;
    - a second device that reads a number of requests $d_m(t_k)$ effectively served from a measurement device, and generates an output;
    - a comparing device that computes a difference between the output of the first and the second devices;
    - a processing unit computing an actuation rate $r_a(t_k)$ as a function of the difference computed by said comparing device.

11. The system according to claim 10, wherein the processing unit computes the actuation rate $r_a(t_k)$ as an output of a linear or non-linear, time invariant or time varying difference or differential equation whose input is the difference computed by said comparing device.

12. The system according to claim 10, wherein the processing unit computes the actuation rate $r_a(t_k)$ proportionally to the difference computed by said comparing device.

* * * * *